June 27, 1944.  T. V. BUCKWALTER  2,352,162
CAR TRUCK
Filed Dec. 29, 1941  2 Sheets-Sheet 1
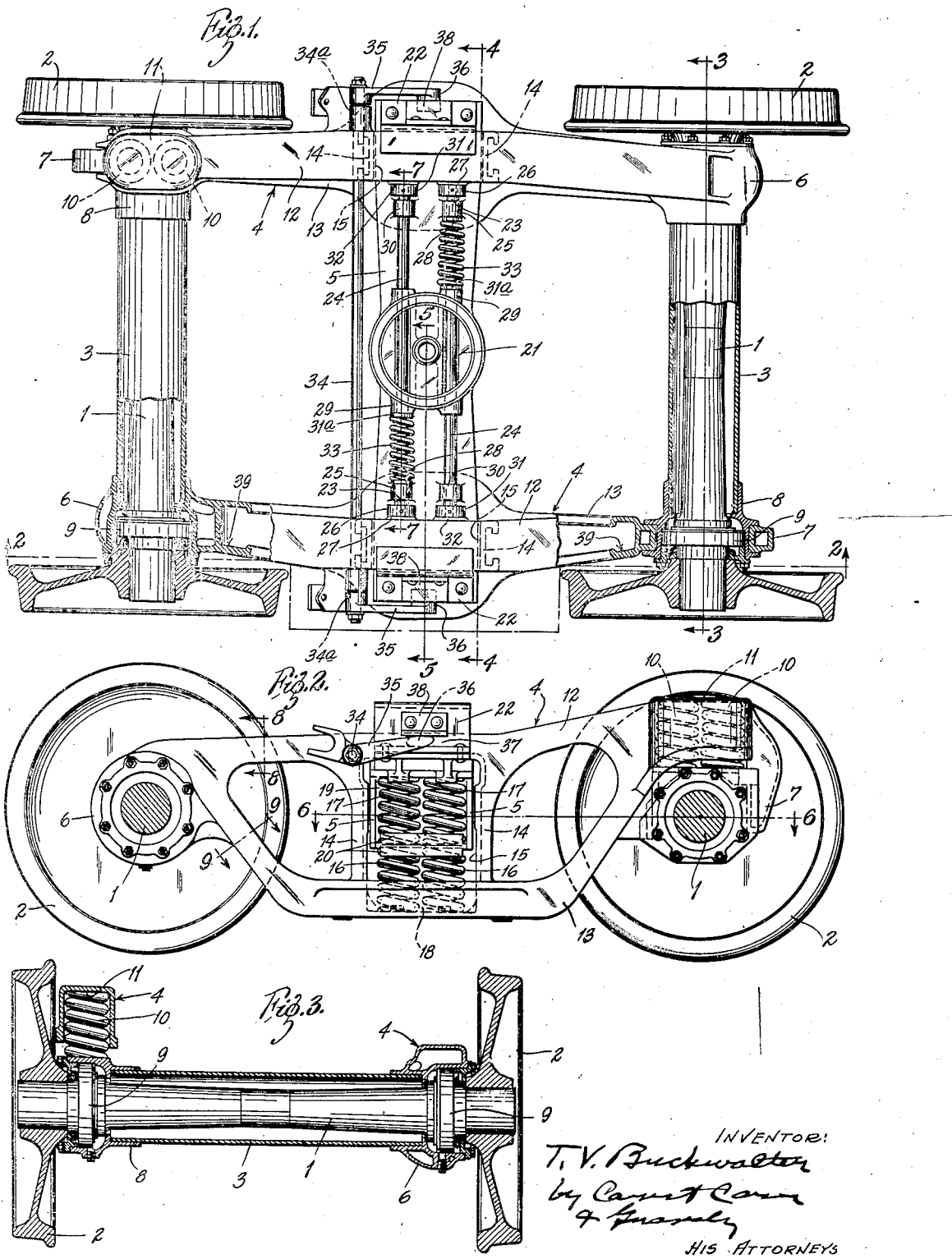
INVENTOR:
T. V. Buckwalter
by Carnot Carr
& Gransby
HIS ATTORNEYS

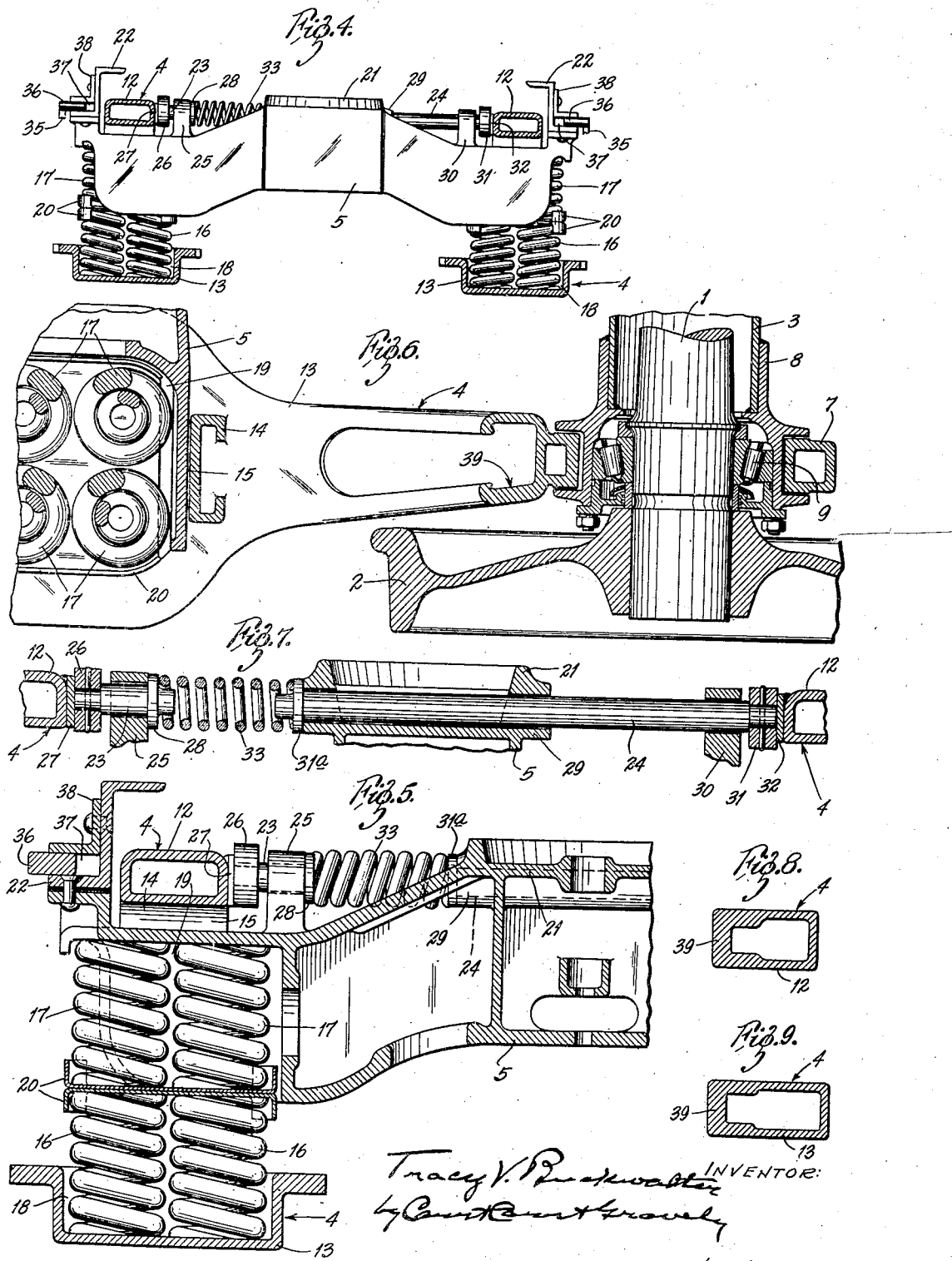

Patented June 27, 1944

2,352,162

UNITED STATES PATENT OFFICE 2,352,162

CAR TRUCK

Tracy V. Buckwalter, Massillon, Ohio, assignor to The Timken Roller Bearing Company, Canton, Ohio, a corporation of Ohio Application December 29, 1941, Serial No. 424,692

5 Claims. (Cl. 105—197.2)

This invention relates to railway car trucks, particularly spring-plankless inboard trucks of the type shown in my Patent No. 1,640,180, dated August 23, 1927, wherein the side frames are rigidly connected to the axle housings at two diagonally opposite corners of the truck and are loosely connected to said housings at the other diagonal corners of said truck.

The invention has for its principal objects to provide a truck that will preserve all of the advantages of the above type of truck and, at the same time, improve the riding qualities thereof under high speed operation; that will provide increased flexibility between the side frames and axle housings at the loose corners of the truck without friction and galding; that will cushion destructive shocks between the rails and wheel flanges when passing through switches and when traveling around curves; that will reduce the amount of unsprung weight; that will check excessive lateral motion in the truck and return the parts to normal position; and that will equalize the load on the bolster springs and prevent excessive rocking of the car body.

The invention consists in the improved railway car truck and in the construction, combinations and arrangements of parts hereinafter described and claimed.

In the accompanying drawings, which form part of this specification and wherein like symbols refer to like parts wherever they occur, Fig. 1 is a part top plan and a part horizontal sectional view of a railway car truck embodying my invention, Fig. 2 is a vertical longitudinal sectional view on the line 2—2 in Fig. 1, Fig. 3 is a transverse sectional view on the line 3—3 in Fig. 1, Fig. 4 is a vertical transverse sectional view on the line 4—4 in Fig. 1, Fig. 5 is a fragmentary vertical transverse section on the line 5—5 in Fig. 1, Fig. 6 is a horizontal sectional view on the line 6—6 in Fig. 2, Fig. 7 is a fragmentary vertical transverse section on the line 7—7 in Fig. 1; and Figs. 8 and 9 are cross-sectional views on the lines 8—8 and 9—9, respectively, in Fig. 2.

In the accompanying drawings, my invention is shown embodied in a spring-plankless inboard railway car truck of the type shown in my Patent No. 1,640,180, dated August 23, 1927, wherein a pair of axles 1 have wheels 2 fixed to the ends thereof, tubular axle housings 3 enclose said axles between the wheels thereon, side frames 4 connect said axle housings, and a cross beam or bolster 5 extends from side frame to side frame midway of the ends of said truck.

One end of each truck side frame 4 has a tubular portion 6 integral therewith that extends transversely thereof and has its inner end portion sleeved on and welded or otherwise rigidly secured to the adjacent end portion of an axle housing 3. The other end of said truck side frame is formed with a downwardly opening substantially U-shaped pedestal 7 that fits over a tubular member 8 that is welded or otherwise rigidly secured to the adjacent end portion of the other axle housing.

The tubular side frame portions 6 and the tubular members 8 constitute end sections for the axle housings 3 and housings for conical roller bearings 9 that are interposed between the axles 1 and said end sections of said axle housings. The pedestal end of each side frame is supported on the axle housing straddled thereby by means of a two unit group of coil compression springs 10 which rest on the housing extension 8 between the legs of the pedestal 7 and seat in a downwardly opening pocket or recess 11 provided therefor in said side frame above said pedestal.

When the truck is assembled, the rigid connections between the truck side frames and the axle housings are located at two diagonally opposite corners of the truck and the loose pedestal connections between said side frames and said axle housings are located at the other diagonal corners of said truck. Thus, the truck is at all times prevented from going out of square by the rigid connections between the side frames and axle housings at two diagonally opposite corners of the truck, while the loose spring supported pedestal connections between the side frames and housings hold the axles horizontally but permit relative vertical movement of the side frames and housings at the other diagonal corners of the truck.

Each side frame 4 comprises a truss structure including a compression member 12 and a tension member 13 that converge toward the ends of said side frame and are connected midway of said ends by a pair of upright bolster or column guides 14 that form a double strut between said compression and tension members and cooperate therewith to provide an opening 15 adapted to receive the adjacent end of the truck bolster 5. The truck bolster 5 has each end yieldably supported in said bolster opening 15 of a side frame 4 for vertical movement relative thereto preferably by means of two superimposed four unit nests or groups of helical coil springs 16 and 17. The lower group of springs 16 seat in a pocket or recess 18 provided therefor in the bottom of the bolster opening 15, and the upper group of springs 17 seat in a downwardly and outwardly opening pocket or recess 19 provided therefor in the bolster end. Two spring plates 20 are welded together back to back and are interposed between the upper and lower groups of bolster springs, the lower plate forming a cap for the lower spring group and the upper plate forming a seat for the upper spring group.

The truck bolster 5 has an upstanding center plate ring 21 formed integral therewith and is provided outwardly of the truck side frames 4 with upstanding Z-shaped side bearing brackets 22 arranged with their webs vertically and with their lower flanges outstanding and riveted or otherwise rigidly secured flatwise to the top of the bolster.

The truck is provided on opposite sides of the longitudinal center line of the bolster with lateral motion resisting devices. Each of these devices comprises two spaced axially alined horizontal bars or rods 23 and 24 mounted on the bolster for independent axial sliding movement crosswise of the truck. The rod 23 is a relatively short rod that is slidably supported in a single upstanding lug 25 on the bolster and is provided at its side frame opposing end with a head 26 that is disposed in endwise abutting relation to a pad 27 welded to the inner side face of the compression member 12 of one side frame. The other end of the short rod 23 has a collar 28 rigid therewith that is disposed in abutting relation to the inner side face of the lug 25 for supporting said rod. The other rod 24 is a relatively long rod that is slidably supported in lugs 29 and 30 formed on and spaced apart lengthwise of the bolster and is provided at its side frame opposing end with a head 31 that is disposed in abutting relation to a pad 32 welded to the inner side face of the compression member 12 of the other side frame. The other or inner end of the long rod 24 has a collar 31a rigid therewith that is disposed in abutting relation to the supporting lug 29 for said rod. Interposed between the spaced adjacent ends of the two relatively movable rods 23 and 24 is a heavy, preloaded coil compression spring 33 which seats against the collars 28 and 31a on said ends of said rods and normally holds said collars against the opposing faces of the lugs 25 and 29, respectively. By this arrangement, transverse shocks between the side frames and the bolster are cushioned or dampened by the spring 33 of each lateral motion resisting device which also operates to return the parts to normal position.

The truck is provided with a device for equalizing the load on the bolster springs and for preventing excessive rocking of the car body. The device comprises a rod 34 that extends crosswise of the truck alongside of the truck bolster and has its ends journaled in suitable transverse openings or bearings 34a provided therefor in the respective side frames 4. Arms 35 are rigidly secured to the rod 34 outwardly of the side frames and terminate at their outer ends in inwardly extending lugs 36 that seat in horizontal slideways 37 that extend longitudinally of the truck side frames along the outer side faces thereof. The portions of the lugs 36 that engage the top and bottom surfaces of the slideways 37 are convexly curved so as to permit rocking as well as sliding movement of said lugs therein.

The horizontal slideways 37 are formed by the lower portions of the side bearing brackets 22 and angle brackets 38 riveted to the webs of the brackets 22 above the base flanges thereof.

As shown in the drawings, the side frames 4 converge towards each other from the bolster openings 15 therein to the ends thereof, thus producing a slightly offset condition in the side frames at said openings that tends to cause sidewise tilting of the side frames under the load transmitted thereto by the bolster springs. To overcome this tendency of the side frames to tilt under such loading, the thickness of the outer side walls and the outer side portions of the top and bottom walls of the compression and tension members is increased, as at 39 (see Figs. 8 and 9), between the bolster openings and the wheels, so as to provide more metal in the outer side portions of said members than in the inner side portions thereof, thereby bringing the vertical neutral axis of each side frame substantially in a vertical plane passing through the center of the bolster spring groups.

By the arrangement described, the truck is at all times prevented from going out of square by the rigid connections between the side frames and the axle housings at two diagonally opposite corners of the truck, while the pedestal connections between the side frames and housings at the other diagonal corners of the truck provide sufficient looseness and flexibility to enable the truck to accommodate itself to rough or uneven track. The two coil spring sets interposed between the tops of the axle housings and the pedestal ends of the side frames serve to reduce the unsprung weight of the truck and cushion the shock between the rails and wheel flanges when passing through a switch frog or traveling around a curve and also provide complete flexibility of movement between the pedestal jaws and housings without friction or galding. The lateral control devices cushion the transverse shocks between the bolster and side frames and thus prevent such shocks from being transmitted directly through the side frames to the bearings and also serve to return the bolster and side frames to normal position. The levers rigidly secured to the ends of the torsion rod are jointly movable in response to an increased load on either of the side frames and thus serve to equalize the load on the bolster springs. This torsional device also serves to equalize the rocking loads on the bolster springs and thus reduces the rocking tendency of the car body. By thickening of the outer side portions of the inwardly converging end portions of the side frames the vertical neutral axes thereof are located so as to overcome the tendency for the side frames to tilt under the load transmitted thereto through the bolster springs, thus equalizing the load on the bearings, relieving the axle housings of bending stresses, reducing axle deflection and increasing the life of the bearings.

Reference is hereby made to my copending applications Serial Nos. 531,848 and 531,849, both filed April 20, 1944, for subject matter divided out of this application.

Obviously, the hereinbefore described truck construction admits of considerable modification without departing from the invention. Therefore, I do not wish to be limited to the precise arrangement shown and described.

What I claim is:
1. A spring-plankless inboard car truck comprising wheeled axles, housings enclosing said axles between the wheels thereon and side frames having their ends mounted on the ends of said housings, said side frames being rigidly secured to said housings at two diagonally opposite corners of said truck and being loosely connected to said housings at the other diagonally opposite corners of said truck, a bolster, and compression springs seated on said side frames and yieldably supporting said bolster thereon, each of said loose connections comprising a pedestal rigid with one end of a side frame and fitting over the adjacent end of a housing and constituting the sole connection between said side frame and said housing, thereby permitting free relative vertical movement of said ends of said side frame and housing while holding the latter in place horizontally, and a multi-unit group of metal compression coil springs resting on said housing and supporting the pedestal end of said side frame thereon, said end of said side frame having a downwardly opening pocket therein enclosing said group of springs and forming a seat for the upper ends thereof.

2. A spring-plankless inboard car truck comprising wheeled axles, housings enclosing said axles between the wheels thereon and side frames having their ends mounted on the ends of said housings, said side frames being rigidly secured to said housings at two diagonally opposite corners of said truck and being loosely connected at the other diagonally opposite corners of said truck, each of said loose connections comprising a pedestal rigid with one end of a side frame and fitting over the corresponding end portion of a housing, and a spring seated on said portion of said housing and yieldably supporting said end of said side frame for free vertical movement relative thereto, said side frames having bolster openings therein and pockets in the bottoms of said openings, springs disposed in said bolster openings and seating in the pockets therein, and a bolster having its ends disposed in said bolster openings and supported on said springs.

3. A spring-plankless inboard car truck comprising wheeled axles, housings enclosing said axles between the wheels thereon and side frames having their ends mounted on the ends of said housings, said side frames being rigidly secured to said housings at two diagonally opposite corners of said truck and being loosely connected to said housings at the other diagonally opposite corners of said truck, each of said loose connections comprising a pedestal rigid with one end of a side frame and fitting over the corresponding end portion of a housing, and a multi-unit group of coil springs resting on said portion of said housing and yieldably supporting said end of said side frame, said end of said side frame having a downwardly opening pocket therein enclosing said group of springs and forming a seat for the upper ends thereof, said side frames having bolster openings therein and recesses in the bottom of said openings, a bolster having its end portions disposed in said bolster openings and recesses in the bottoms of said end portions, and two superimposed multi-unit groups of coil springs disposed in the bolster opening of each side frame with the springs of the bottom group seating in the recess in the bottom of said opening and with the springs of the top group seating in the recess in the bottom of the bolster.

4. A spring-plankless inboard car truck comprising wheeled axles, housings enclosing said axles between the wheels thereon, side frames connecting corresponding ends of said housings and having bolster supporting openings therein, each of said side frames being rigidly secured to said housings at two diagonally opposite corners of said truck and being loosely connected to said housings at the other diagonally opposite corners of said truck, said side frames converging inwardly toward each other from the bolster openings therein to the housing engaging ends thereof, the portions of said side frames between the bolster openings and the housing engaging ends thereof having a greater amount of metal in the outer side portions thereof than in the inner side portions thereof so as to locate the vertical neutral axis of each side frame near the ends thereof substantially in the plane of the vertical neutral axis of the side frame at the bolster opening.

5. A spring-plankless inboard car truck comprising wheeled axles, housings enclosing said axles between the wheels thereon, side frames connecting corresponding ends of said housings and having bolster supporting openings therein, each of said side frames being rigidly secured to said housings at two diagonally opposite corners of said truck and being loosely connected to said housings at the other diagonally opposite corners of said truck, each of said side frames including compression and tension members of hollow cross-section that converge from the bolster openings toward the ends of said frame, said side frames converging inwardly toward each other from the bolster openings therein to the housing engaging ends thereof, the compression and tension members of said side frame having a greater amount of metal in the outer side portions thereof than in the inner side portions thereof, so as to locate the vertical neutral axis of each side frame near the ends thereof substantially in the plane of the vertical neutral axis of the side frame at the bolster opening.

TRACY V. BUCKWALTER.